(12) United States Patent
Ishikawa

(10) Patent No.: US 7,672,525 B2
(45) Date of Patent: Mar. 2, 2010

(54) IMAGE PROCESSING METHOD, PROGRAM, STORAGE MEDIUM, AND APPARATUS FOR EXECUTING A QUANTIZATION PROCESS OF IMAGE DATA BY ERROR DIFFUSION

(75) Inventor: Hisashi Ishikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 10/896,992

(22) Filed: Jul. 23, 2004

(65) Prior Publication Data

US 2005/0025374 A1    Feb. 3, 2005

(30) Foreign Application Priority Data

Jul. 30, 2003   (JP)   ............................. 2003-203937
May 19, 2004   (JP)   ............................. 2004-149388

(51) Int. Cl.
  *G06K 9/00*   (2006.01)
  *G06K 9/38*   (2006.01)
  *H04N 1/40*   (2006.01)
(52) U.S. Cl. ....................... 382/252; 382/251; 382/271; 358/466
(58) Field of Classification Search ................. 382/232, 382/245, 250–252, 270–273; 358/465, 466
See application file for complete search history.

(56) References Cited

U.S. PATENT DOCUMENTS 4,958,238 A  *  9/1990  Katayama et al. .......... 358/3.03
5,115,241 A       5/1992  Ishikawa .................... 341/143
5,436,981 A       7/1995  Ishikawa .................... 382/173

(Continued)

FOREIGN PATENT DOCUMENTS

JP          9-247450          9/1997

OTHER PUBLICATIONS

Villasenor et al. "Low Complexity Compression of Run Length Coded Image Subbands" The International Series in Engineering nad Computer Science Tech . . . Wavelet Image and Video Compression, Springer Netherlands, vol. 450, pp. 221-235.*

(Continued)

*Primary Examiner*—Andrew W Johns
*Assistant Examiner*—Mia M Thomas
(74) *Attorney, Agent, or Firm*—Fitzpatrick, Cella, Harper & Scinto

(57) ABSTRACT

An image processing method for executing a quantization process of image data by error diffusion, executes a step of generating first image data by adding a quantization error to input image data, a step of generating second image data by quantizing the first image data by comparing the first image data with a predetermined threshold value, a step of generating third image data by dequantizing the second image data, a calculation step of calculating a quantization error for each pixel on the basis of the difference between the first and third image data, a storage step of storing information indicating a positive/negative sign of the calculated quantization error for a predetermined number of pixels in a storage unit, and a correction value generation step of generating a correction value used to correct at least one of the first image data and the threshold value on the basis of the information which is stored in the storage unit and indicates the positive/negative sign.

18 Claims, 17 Drawing Sheets

U.S. PATENT DOCUMENTS

| | | | | |
|---|---|---|---|---|
| 5,469,517 | A * | 11/1995 | Ohta | 382/252 |
| 5,553,166 | A * | 9/1996 | Kakutani | 382/252 |
| 5,764,374 | A * | 6/1998 | Seroussi et al. | 382/244 |
| 5,870,503 | A * | 2/1999 | Kumashiro | 382/252 |
| 5,898,796 | A * | 4/1999 | Kumashiro | 382/252 |
| 6,009,206 | A * | 12/1999 | Acharya | 382/251 |
| 6,084,984 | A | 7/2000 | Ishikawa | 382/173 |
| 6,173,081 | B1 * | 1/2001 | Nishikawa | 382/252 |
| 6,233,359 | B1 * | 5/2001 | Ratnakar et al. | 382/250 |
| 6,256,415 | B1 * | 7/2001 | Ratnakar | 382/232 |
| 6,356,361 | B1 * | 3/2002 | Ishikawa et al. | 358/1.9 |
| 6,369,912 | B1 * | 4/2002 | Kumashiro | 358/1.9 |
| 6,459,817 | B1 * | 10/2002 | Matsushiro | 382/252 |
| 6,476,934 | B1 * | 11/2002 | Ilbery et al. | 358/3.04 |
| 6,574,372 | B2 * | 6/2003 | Ratnakar | 382/240 |
| 6,608,701 | B1 * | 8/2003 | Loce et al. | 358/3.09 |
| 6,608,941 | B1 * | 8/2003 | Suzuki et al. | 382/272 |
| 6,621,934 | B1 * | 9/2003 | Yu et al. | 382/252 |
| 6,693,727 | B1 * | 2/2004 | Kanno et al. | 358/3.03 |
| 6,731,817 | B2 * | 5/2004 | Shibaki et al. | 382/252 |
| 6,771,832 | B1 * | 8/2004 | Naito et al. | 382/252 |
| 6,898,322 | B2 * | 5/2005 | Semasa | 382/238 |
| 6,914,700 | B2 * | 7/2005 | Thakur | 358/3.04 |
| 7,265,770 | B2 * | 9/2007 | Faken et al. | 347/171 |
| 7,308,224 | B2 * | 12/2007 | Yamada | 399/301 |
| 7,333,243 | B2 * | 2/2008 | Crutchfield | 358/3.03 |
| 7,369,276 | B2 * | 5/2008 | Couwenhoven et al. | 358/3.03 |
| 7,440,139 | B2 * | 10/2008 | Loce et al. | 358/3.03 |
| 2002/0054354 | A1 * | 5/2002 | Fukao | 358/3.04 |
| 2003/0197897 | A1 * | 10/2003 | Iwasaki et al. | 358/3.03 |
| 2007/0081738 | A1 * | 4/2007 | Mantell | 382/274 |

OTHER PUBLICATIONS

Filippone et al. "A Vectorized Long Period Shift Register Random No. Generator", IBM Euro Center for Scientific and Engineering Computing, pp. 1-9.*

Eschbach et al. "Error Diffusion Algorithm with Edge Enhancement" Journal of Optics Society AM. A/vol. 8, No. 12/Dec. 1991, pp. 1844-1850.*

* cited by examiner

FIG. 2

| $\frac{1}{16}$ | $\frac{5}{16}$ | $\frac{3}{16}$ |
|---|---|---|
| $\frac{7}{16}$ | * | |

FIG. 3

| A | B | C | D | E |
|---|---|---|---|---|
| F | G | H | I | J |
| K | L | * | | |

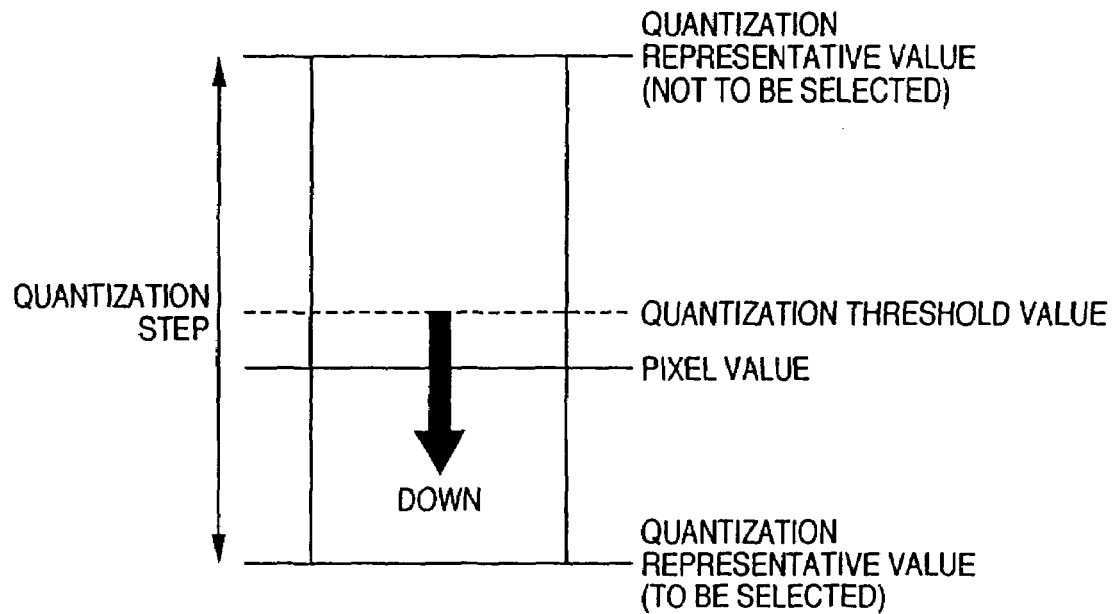
F I G. 15A
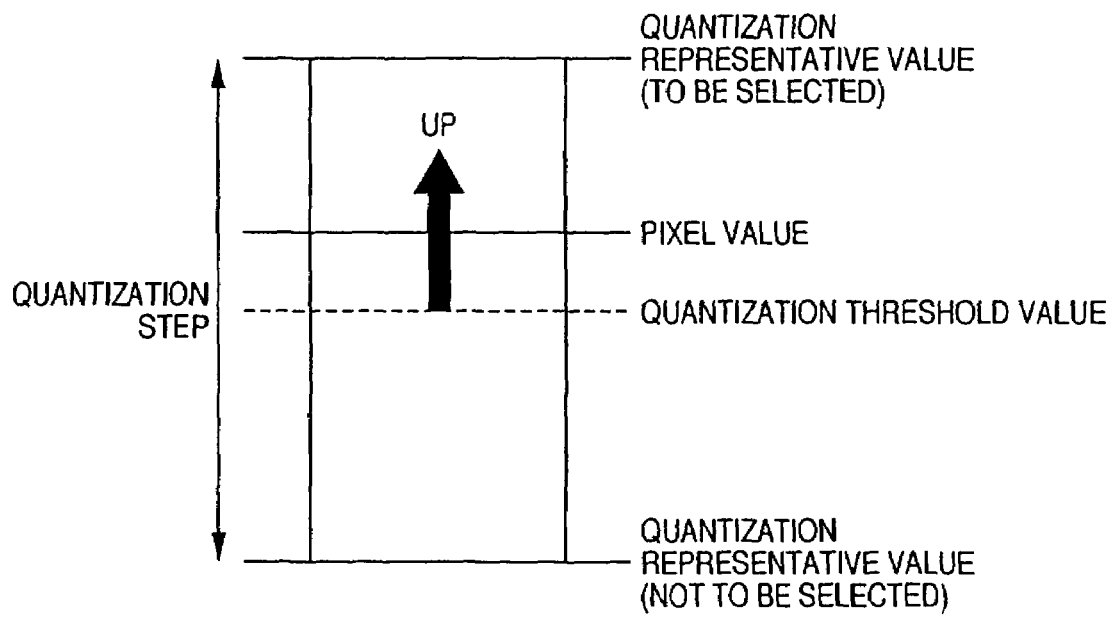
F I G. 15B

IMAGE PROCESSING METHOD, PROGRAM, STORAGE MEDIUM, AND APPARATUS FOR EXECUTING A QUANTIZATION PROCESS OF IMAGE DATA BY ERROR DIFFUSION

FIELD OF THE INVENTION

The present invention relates to an image processing method, program, storage medium, and image processing apparatus and, more particularly, to an image processing method, program, storage medium, and image processing apparatus, which quantize input data into binary or multi-valued data while preserving the difference between the input and output image densities or the like by, e.g., error diffusion.

BACKGROUND OF THE INVENTION

Conventionally, an image processing apparatus which converts input multi-grayscale image data into binary image data and outputs the binary image data adopts, e.g., error diffusion as a method of converting a multi-grayscale image into a binary image. With this error diffusion, a quantization error between the grayscale value of a pixel of interest, and a fixed binarization threshold value used to binarize this grayscale value is diffused to the grayscale values of neighboring pixels of the pixel of interest, and these grayscale values are sequentially binarized.

However, when a local image which suffers a large density change in a multi-valued image is to be binarized by error diffusion, the following phenomena are observed in a quantized image. Basically, a quantization method using error diffusion is based on the principle of diffusing the density value of a pixel to neighboring pixels. For this reason, in an image having a change portion from a high density to low density and vice versa, which often appear in characters, edges, and the like, dot generation after binarization is delayed. This means that the dot positions of the quantized image become different from those in the multi-valued image. For this reason, a phenomenon called "sweeping" occurs in a change portion from the high density to low density. "Sweeping" indicates the absence of dots at positions where they should be actually present. That is, in case of a binary image in which the density value of a white pixel is expressed by 0 and that of a black pixel is expressed by 1, the density value of a pixel whose density value must be 1 becomes 0 due to delay of dot generation and distribution of quantization errors. Contrary to sweeping, phenomena such as crush in shadow, disruption, and the like of an image occur in a change portion from the low density to high density since the density value of a pixel, whose pixel value must be 0 becomes 1. With these phenomena, when a multi-valued image is quantized using error diffusion, density reproducibility often impairs. As a result, when such image is displayed or printed, it is reproduced as an image so-called "pseudo contour".

In a multi-valued image having a specific density pattern, stripe patterns so-called "texture" and "worm" are generated in a reproduced image. Such phenomena often adversely influence the visual impression of a reproduced image.

To solve these problems, U.S. Pat. No. 5,553,166 discloses a method (to be referred to as a first method hereinafter) for solving a problem of delay of dot generation of a pixel of interest by varying a binarization threshold value in accordance with the grayscale value of image data of the pixel of interest so that the threshold value is decreased when the grayscale value (density value) of input image data is small and vice versa.

Also, Japanese Patent Laid-Open No. JP09247450A has proposed a method (to be referred to as a second method hereinafter) for preventing generation of "texture", "worm", and the like by setting a binarization threshold value and diffusion coefficients on the basis of a feature amount such as a change in gradation and the like in a pixel of interest and its surrounding pixels.

However, the first method requires complicated arithmetic operations and discrimination circuits, look-up tables, or the like. Also, a complicated tuning process is required to set an optimal threshold value so as to obtain high image quality. The first method produces nearly no effects in terms of suppression of generation of "texture", "worm", and the like.

Since the second method uses filters based on a human visual system upon calculation of a feature amount, complicated arithmetic operations and discrimination processes are required. Furthermore, the second method has nearly no effect of solving problems of "sweeping" and "pseudo contour" due to disappearance of a dot pattern.

SUMMARY OF THE INVENTION

The present invention relates to an image processing technique for removing image quality deterioration factors due to "sweeping", "texture", "pseudo contour", "worm", and the like in error diffusion by a relatively simple circuit.

More specifically, the present invention is comprising a step of generating first image data by adding a quantization error to input image data, a step of generating second image data by quantizing the first image data by comparing the first image data with a predetermined threshold value, a step of generating third image data by dequantizing the second image data, a calculation step of calculating a quantization error for each pixel on the basis of a difference between the first and third image data, a storage step of storing information indicating a positive/negative sign of the calculated quantization error for a predetermined number of pixels in a storage unit and a correction value generation step of generating a correction value used to correct at least one of the first image data and the threshold value on the basis of the information which is stored in the storage unit and indicates the positive/negative sign.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of the positions of quantization errors and diffusion coefficients used in arithmetic operations of a diffusion filter 109;

FIG. 3 shows an example of a negative sign detection window;

FIGS. 15A and 15B are views for explaining the relationship among the pixel value, quantization threshold value, and quantization representative values;

DETAILED DESCRIPTION OF THE PREFERRED EMBODIMENTS

Preferred embodiments of the present invention will now be described in detail in accordance with the accompanying drawings.

First Embodiment

Figure 1:
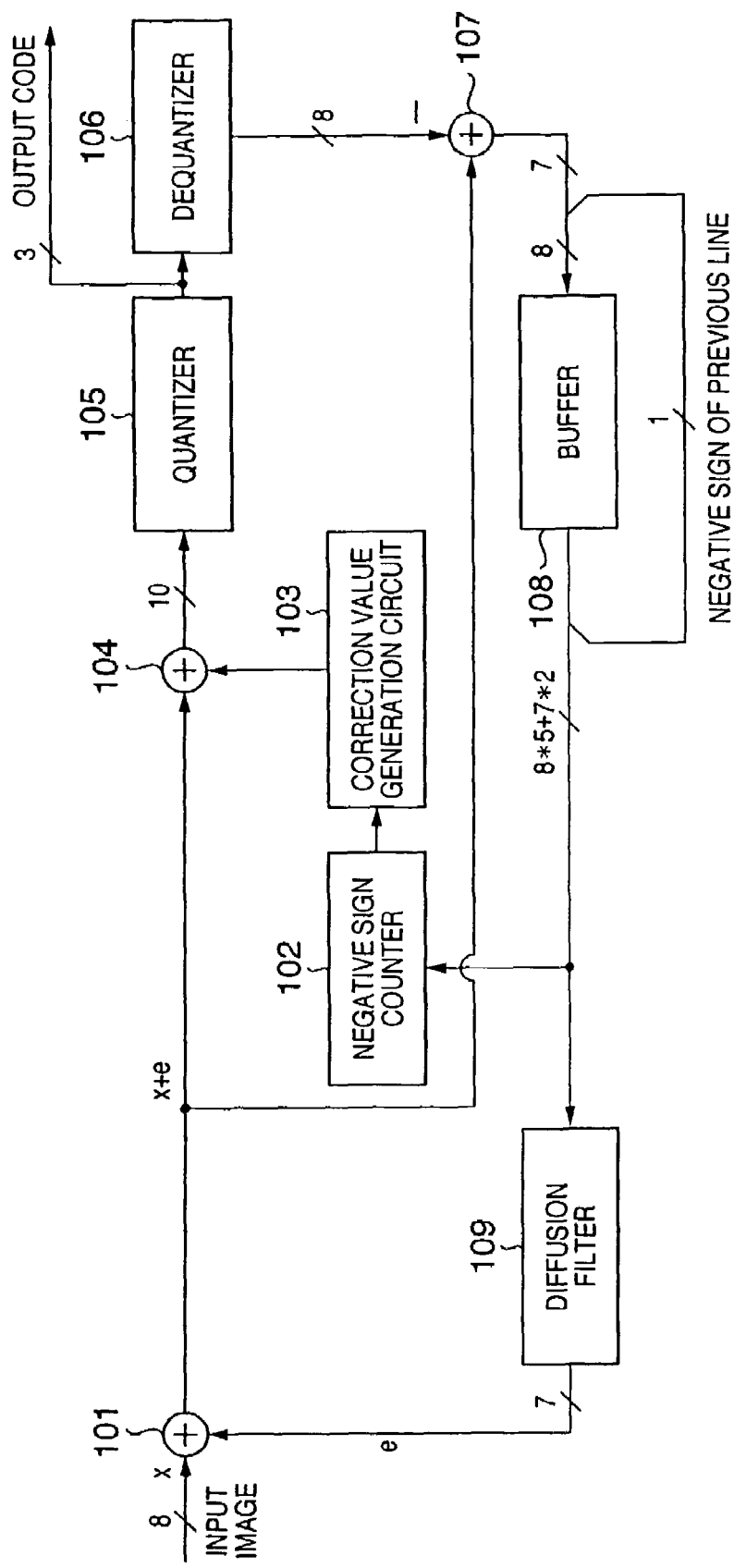
FIG. 1 is a block diagram for explaining the arrangement of an image processing apparatus according to the first embodiment of the present invention.

FIG. 1 is a block diagram showing an example of the arrangement of an image processing apparatus according to the first embodiment of the present invention. Note that the present specification will give an explanation focused on "negative sign (information indicating negative)" of a quantization error in the first embodiment and other embodiments to be described hereinafter. This aims at easy understanding of the present invention. However, the present invention is not limited to information indicating that a quantization error is negative, but may be practiced by replacing it by a positive sign (information indicating positive).

Referring to FIG. 1, reference numeral 101 denotes an adder which generates image data (first image data) obtained by adding an error amount distributed from a diffusion filter 109. Reference numeral 102 denotes a negative sign counter which extracts and counts negative signs of quantization errors from an error buffer 108. Reference numeral 103 denotes a correction value generation circuit which generates correction values of threshold values in a quantizer 105 in accordance with the count value of the negative sign counter 102. Note that this embodiment adopts an arrangement that adds the correction values of the threshold values generated by the correction value generation circuit 103 to image data using an adder 104 to correct the threshold values in the quantizer 105 in place of inputting it to the quantizer 105. The reason why this arrangement is adopted is a design merit, i.e., that a conventionally designed quantizer can be used without any modification. Note that it is known to those who are skilled in the art that adding the correction values of the threshold values to image data relatively corrects the threshold values.

Each embodiment described in the present specification will exemplify the arrangement that adds the correction values of the threshold values to image data. However, an arrangement that inputs the correction values of the threshold values generated by the correction value generation circuit 103 to the quantizer 105 to correct the threshold values stored in the quantizer 105 may be adopted. Alternatively, an arrangement that adds some of the correction values of the threshold values generated by the correction value generation circuit 103 to image data and inputs the remaining correction values to the quantizer 105 may be adopted.

Reference numeral 104 denotes an adder which generates image data obtained by adding the correction values of the threshold values to the image data which is added with the error amount and is output from the diffusion filter 109. Reference numeral 105 denotes a quantizer which compares corrected input image data with the threshold values, and converts them into output codes (second image data). Reference numeral 106 denotes a dequantizer which generates a quantization representative value (third image data) from the output codes. Reference numeral 107 denotes a subtractor which generates a quantization error by subtracting the quantization representative value from the image data added with the correction values. Reference numeral 108 denotes an error buffer which delays the quantization error and a quantization error negative sign of a pixel one line before by about one line, and outputs error values of pixels required for the arithmetic operations of the diffusion filter 109. Reference numeral 109 denotes a diffusion filter which generates the sum total of the products of the quantization errors of pixels to be diffused of the previous and current lines, and corresponding coefficients, and adds that sum total to the next input image data using the adder 101.

In FIG. 1, numerical values (e.g., 8, 10, 3, 7, and the like) on lines indicate the numbers of bits of data on these lines.

A practical operation of the image processing apparatus corresponding to this embodiment will be described below.

In this embodiment, the image processing apparatus adopts an arrangement that stores quantization errors themselves in the error buffer to extract negative signs of quantization errors from the error buffer 8 in place of storing error-diffused values (values from the diffusion filter) in the error buffer. Note that this arrangement can reduce the size of the error buffer 108. Of course, error-diffused values may be stored in the error buffer, and a quantization error negative sign buffer may be added as in the conventional error diffusion.

Figure 2:
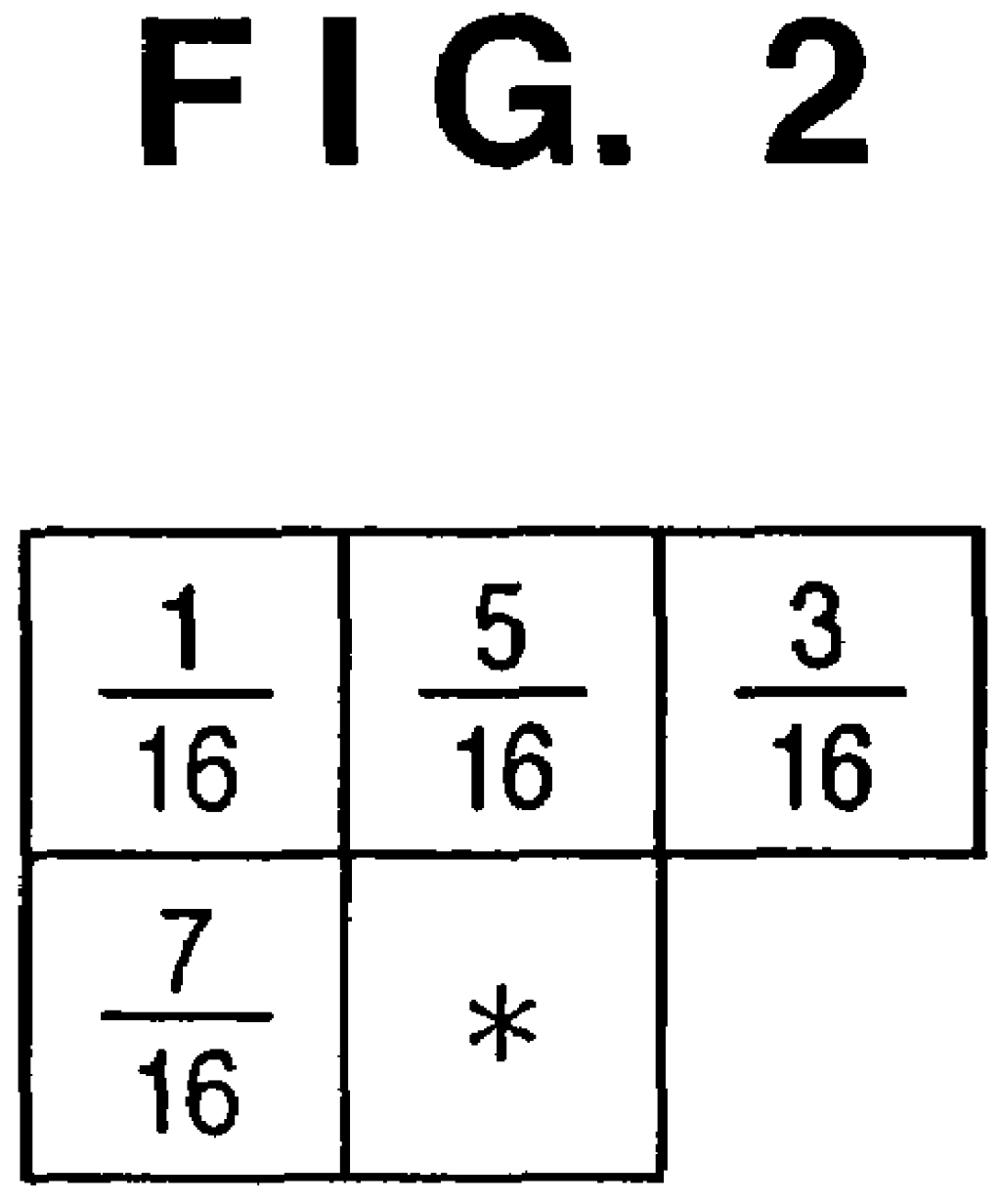

Also, as shown in FIG. 1, input image data is 8-bit data, and 5-valued error diffusion is made using diffusion coefficients shown in FIG. 2.

FIG. 2 shows an example of diffusion coefficients used in the arithmetic operations of the diffusion filter 9. Referring to FIG. 2, a pixel indicated by * is a pixel of interest. The products of quantization error values in a pixel group near the pixel of interest, and coefficients corresponding to the positional relationship between respective pixels in the pixel group and the pixel of interest are added to the pixel value of the pixel of interest. In this embodiment, in a method of calculating the correction value of the next pixel based on surrounding quantization errors (an average error minimizing method), the diffusion coefficients and their positions of error diffusion have a point symmetry to have the pixel of interest as the center.

Figure 3:
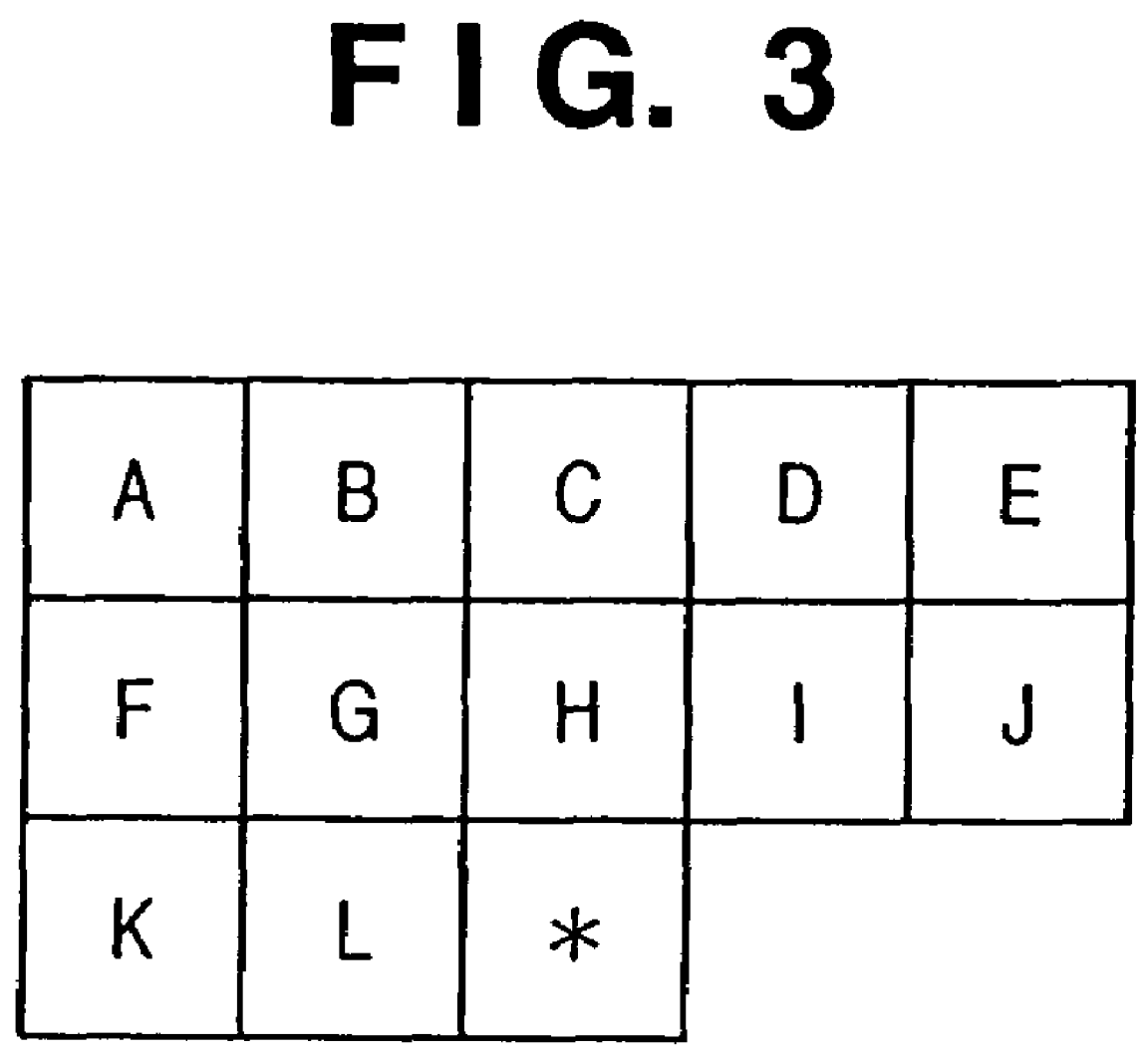

FIG. 3 shows an example of a negative sign detection window input to the negative sign counter 102. This negative sign detection window is used to determine a pixel group near the pixel of interest, from which negative signs of quantization error values are to be counted, when * is the pixel of interest. The error buffer 108 receives the same value as the MSB (most significant bit) of a quantization error at the position of the pixel of interest of the previous line, which is appended to the LSB (least significant bit) side of a quantization error of the current pixel of interest (*). Note that the MSB of the quantization error indicates the positive/negative sign of the quantization error.

The error buffer 108 holds the quantization errors of pixels (corresponding to positions F, G, H, I, and J in FIG. 3) one line before near the pixel of interest (*), and the quantization error negative signs of pixels (corresponding to positions A, B, C, D, and E in FIG. 3) two lines before near the pixel of interest (*) if * is the current pixel of interest.

Also, the error buffer 108 can hold the quantization error of a pixel (corresponding to a position L in FIG. 3) two pixels before in the same line as the pixel of interest (*) and the quantization error negative sign of a pixel (corresponding to a position K in FIG. 3) one pixel before in the same line as the pixel of interest (*).

Note that the pixel group (corresponding to the positions A, B, C, D, and E in FIG. 3) two lines before the line of the pixel of interest (*), and the pixel (corresponding to the position K in FIG. 3) one pixel before in the same line as the pixel of interest (*) need only store bits corresponding to the quantization error negative signs. This is because the quantization errors of the pixels at these positions are not used in the arithmetic operations of the diffusion filter 109 shown in FIG. 2 aftertime.

Only the negative sign bits of respective pixels are finally extracted from this error buffer 108, and the negative sign counter 102 counts the number of negative signs (the total number of "1"s).

Note that detecting the negative signs of pixels A to L from the error buffer 108 is to search for a positive/negative change point of quantization errors over a broader range, and to make discrimination with higher precision. The reason why the positive/negative change point is to be searched for is based on a feature of error diffusion: a dot is generated at the change point. This process can suitably prevent generation of specific patterns such as "texture", "worm", and the like. Of course, the image processing method of the present invention and the image processing apparatus that executes the image processing method are not limited to the configurations of the error buffer and negative sign detection window, and the number of pixels and region to be detected can be arbitrarily set. Since the positive/negative change point is to be detected, an arrangement that detects the positive sign may be adopted.

Figure 4:
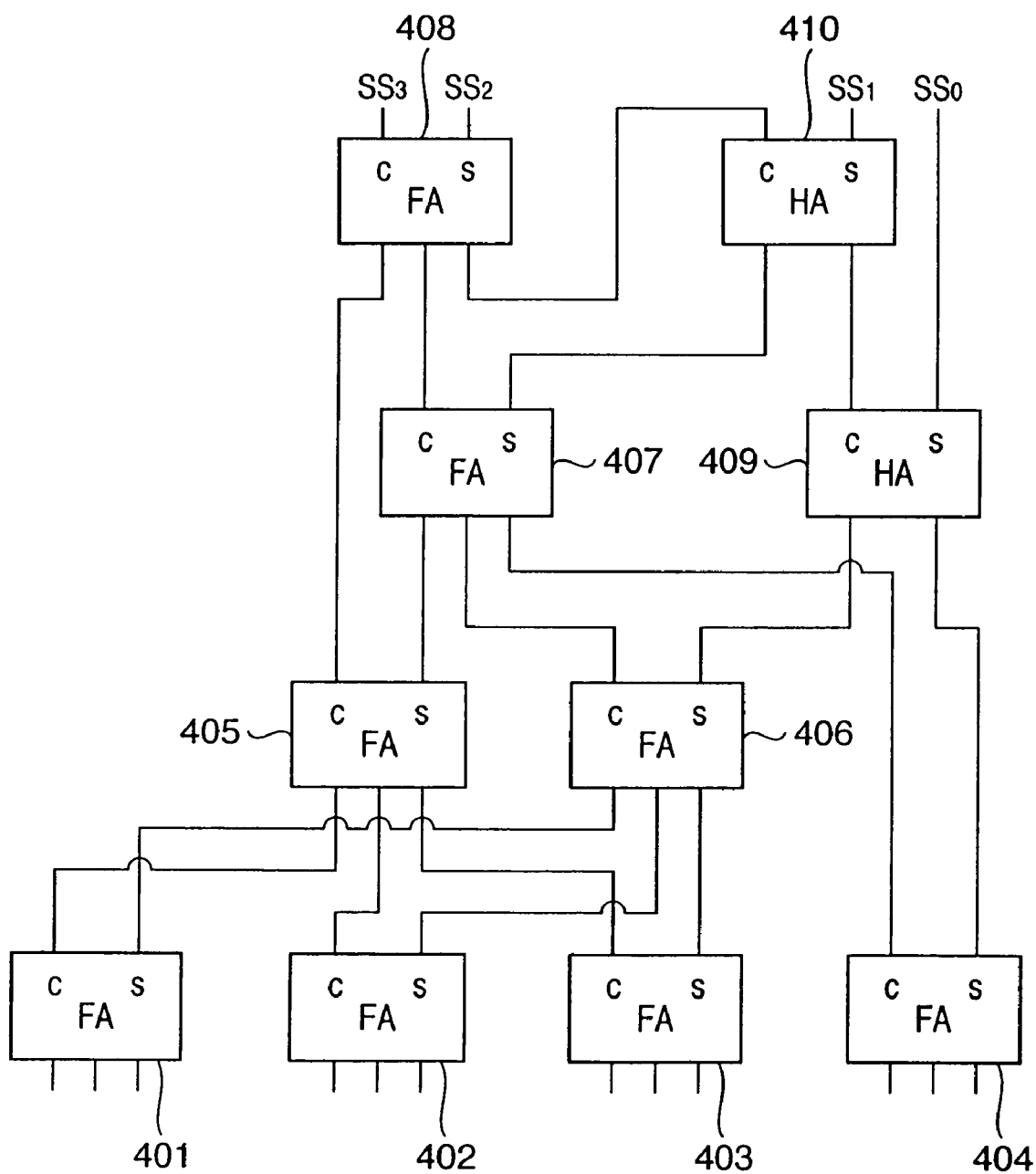
FIG. 4 is a diagram showing an example of the arrangement of a negative sign counter 102.

FIG. 4 shows an example of the practical arrangement of the negative sign counter 102. Referring to FIG. 4, reference numerals 401 to 408 denote full adders; and 409 and 410, half adders. Input negative signs A to L of the quantization errors are input to a tree-like adder formed by the full adders 401 to 408 and half adders 409 and 410, and the number of pixels whose negative signs are 1 (i.e., the total number of negative signs) is output as 4 bits SS3, SS2, SS1, and SS0. The correction value generation circuit 103 converts the total number of negative signs near the pixel of interest, which is counted by the negative sign counter 102 into a correction value of a threshold value. For example, in case of 5-valued error diffusion, if SS represents the total number of negative signs, a correction value Thd of a threshold value can be expressed as a correction value table:

TABLE 1

| | SS | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| Thd | 24 | 20 | 16 | 12 | 8 | 4 | 0 | −4 | −8 | −12 | −16 | −20 | −24 |

When the total number SS of negative signs is small, since a pixel value is smaller than the quantization threshold value, as shown in, e.g., FIG. 15A, a quantization representative which is smaller than and closest to the input level value is selected as that of surrounding pixels in a flat portion, and many pixels have positive quantization errors. Therefore, in such case, the threshold value must be lowered to facilitate selection of a quantization representative value which is larger than and closest to the input level value.

On the other hand, when the total number SS of negative signs is large, since a pixel value is smaller than the quantization threshold value, as shown in, e.g., FIG. 15B, a quantization representative which is larger than and closest to the input level value is selected as that of surrounding pixels, and many pixels have negative quantization errors. Therefore, in such case, the threshold value must be raised to facilitate selection of a quantization representative value which is smaller than and closest to the input level value. Note that the quantization representative value will be described later.

Hence, the correction values assume positive values when the total number of negative signs is smaller than ½ of the number of pixels (i.e., the maximum value of SS) used to detect the negative signs by the negative sign detection window, and the correction values assume negative values when the total number of negative signs is larger than ½ of the number of pixels used to detect the negative signs by the negative sign detection window. In this manner, the absolute values of the correction values are preferably set to have positive/negative symmetry.

Using such symmetry of the correction values, only one of positive and negative regions of correction values can be defined. That is, when the total number SS of negative signs is smaller than ½ of the number of pixels used to detect the negative signs by the negative sign detection window, the adder 104 adds the correction value; when the total number SS of negative signs is larger than ½ of the number of pixels used to detect the negative signs by the negative sign detection window, the adder 104 subtracts the correction value.

According to this arrangement, the table size can be halved. Also, "sweeping" stands out when the total number SS of negative signs is zero or is equal to the number of pixels used to detect the negative signs by the negative sign detection window (12 in FIG. 3), the correction value may be corrected only in such cases.

Since the correction value Thd of the threshold value decreases in proportion to an increase in the total number SS of negative signs in Table 1, the correction value may be generated by the following equation:

$$Thd = 24 - SS \times 4 \quad (1)$$

As described above, in this embodiment, the threshold value correction value Thd is added to a pixel value immediately before the quantizer 105 in place of being input to the quantizer 105. That is, in this embodiment, the threshold value is not directly corrected by the correction value, but the input image data of the quantizer 105 is corrected, thus indirectly correcting the quantization threshold value. As a result, the quantizer 105 can adopt the conventional arrangement.

Figure 16:
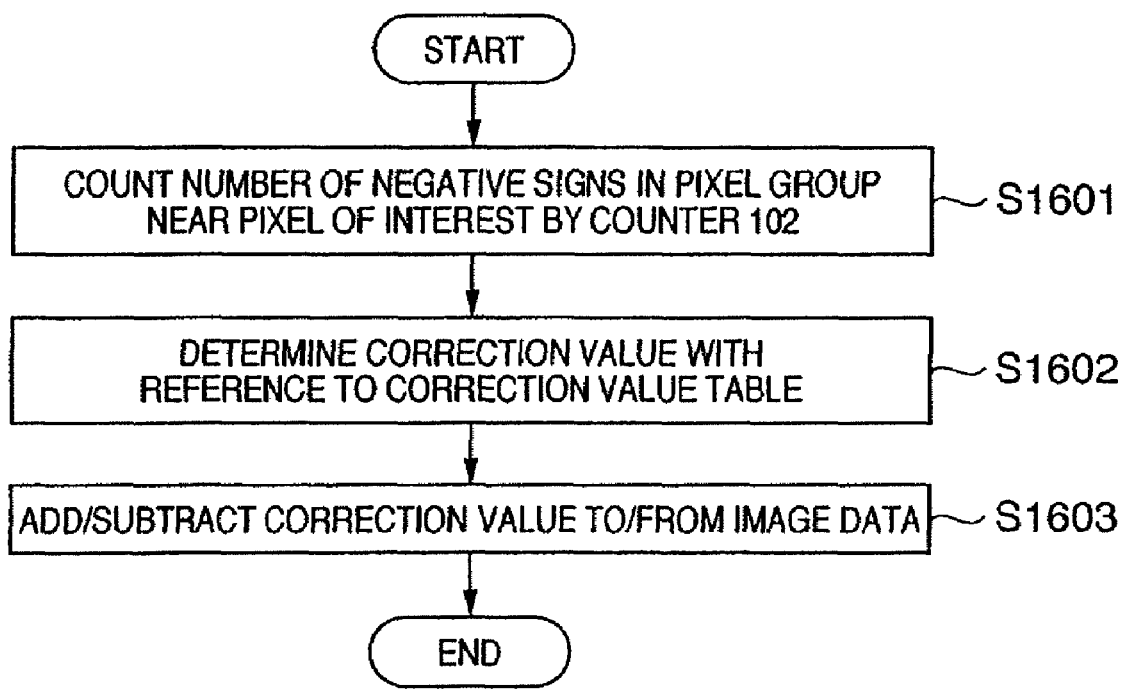
FIG. 16 is a flowchart showing an example of a correction value generation process corresponding to the first embodiment of the present invention.

An example of a correction process of input data to the quantizer 105 in this embodiment will be described below with reference to the flowchart of FIG. 16.

In step S1601, the number of negative signs in a pixel group (A to L in FIG. 3) near the pixel of interest is counted by the negative sign counter 102. In step S1602, a correction value (corresponding to that of a threshold value) of image data to be input to the quantizer 105 is determined with reference to a correction value table (e.g., Table 1) on the basis of the number of negative signs counted in step S1601. Upon determining the correction value, a value ½ the quantization step may be added as an offset, as will be described later. In step S1603, the input data is corrected by adding the correction value determined in step S1602 to that data.

As described above, the corrected input data is converted into a 5-valued code by the quantizer 105. Let x+e+Thd be the input image data after threshold value correction. Then, an output code c is given by:

$$c=0 \text{ when } x+e+Thd<32$$

$$c=1 \text{ when } 32 \leq x+e+Thd<96$$

$$c=2 \text{ when } 96 \leq x+e+Thd<160$$

$$c=3 \text{ when } 160 \leq x+e+Thd<224$$

$$c=4 \text{ when } 224 \leq x+e+Thd \tag{2}$$

In order to support the conventional quantizer 105 which quantizes 8-bit image data, the correction value generation circuit 103 generates a threshold value correction value Thd1 obtained by adding 32 (a value ½ the quantization step) as an offset amount. In this case, let x+e+Thd1 be the corrected input image data after addition of the threshold value correction value Thd1. Then, an output code c is given by:

$$c=0 \text{ when } x+e+Thd1<64$$

$$c=1 \text{ when } 64 \leq x+e+Thd1<128$$

$$c=2 \text{ when } 128 \leq x+e+Thd1<192$$

$$c=3 \text{ when } 192 \leq x+e+Thd1<256$$

$$c=4 \text{ when } 256 \leq x+e+Thd1 \tag{3}$$

That is, the output code c can be obtained by extracting the upper 3 bits except for the negative sign bit of the corrected input image data after addition of the threshold value correction value. For example, when x+e+Thd1=63, 64, 128, 192, and 256, since they are respectively "00011111", "00100000", "01000000", "01100000", and "10000000" in decimal notation, their upper 3 bits are "000", "001", "010", "011", and "100", which are respectively "0", "1", "2", "3", and "4".

As will be described later, the output code c often assumes a value falling outside the range depending on the value of the correction value e. More specifically, such case occurs when x+e+Thd1<0 and x+e+Thd1>319.

When x+e+Thd1<0, a value obtained by extracting the upper 3 bits except for the negative sign bit is 7 (111). However, since a desired output code is 9, "7" is converted into "0" when it is output (since the quantization error range is ±63, and 6 is not present, if the upper 2 bits are "11", all bits are set to be "0"s).

When x+e+Thd1>319, a value obtained by extracting the upper 3 bits except for the negative sign bit is 5 (101) (6 is not present since the quantization error range is ±63). Since a desired output code is 4, "5" is converted into "4" when it is output (if the upper 2 bits are "10", "1" as the least significant bit is converted into "0").

Table 2 below shows values obtained by adding an offset to Table 1.

TABLE 2

| | SS | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| Thd | 56 | 52 | 48 | 44 | 40 | 36 | 32 | 28 | 24 | 20 | 16 | 12 | 8 |

Also, equation (1) is expressed by:

$$Thd1=56-SS \times 4 \tag{4}$$

The dequantizer 106 converts the output code c from the quantizer 105 into a quantization representative value r. More specifically, we have:

$$r=0 \text{ when } c=0$$

$$r=64 \text{ when } c=1$$

$$r=128 \text{ when } c=2$$

$$r=192 \text{ when } c=3$$

$$r=255 \text{ when } c=4$$

Hence, except for c=4 (i.e., MSB=0), a value obtained by coupling "0"s for six bits to the lower side of the 2 bits excluding the MSB is used as a quantization representative value. When c=4 (i.e., MSB=1), a value obtained by setting all bits="1"s is used as a quantization representative value.

The subtractor 107 generates a quantization error by subtracting the quantization representative value from the image data added with the correction value by the diffusion filter 109. That is, since the correction value of the threshold value is present within the feedback loop of error diffusion, it does not influence low-frequency components of an input image, thus improving "sweeping".

The quantization error range in the quantizer 105 is broadened to ±56 (in case of Table 1; normally, the maximum value of Thd1), the output of the subtractor 107 requires 7 bits (1 bit for the negative sign, 6 bits for the quantization error).

As shown in FIG. 3, since the threshold value correction value requires the quantization error negative sign two lines before the line including the pixel of interest when it is generated, the error buffer 108 receives 8 bits generated by appending the MSB one line before (i.e., the quantization error negative sign one line before) to the LSB side.

The diffusion filter 109 calculates the sum total of the products, each of which is calculated by multiplying 7 bits obtained by removing the LSB from a pixel to be diffused of the previous line, which is output from the error buffer 108, by the corresponding coefficients or coefficients corresponding to the quantization error of an immediately preceding pixel, and adds that sum total to input image data. Since the denominator of each diffusion coefficient in FIG. 2 is 16, the output value from the diffusion filter 109 has a total of 11 bits (an integer part: 7 bits, a decimal part: 4 bits). The 7-bit integer part is added to the input image data.

As described above, according to the present invention corresponding to this embodiment, since input data to the quantizer can be corrected in accordance with the number of negative signs of quantization errors in a pixel group near the pixel of interest, image quality deterioration factors due to "sweeping", "texture", "worm", and the like in error diffusion can be removed by a relatively simple circuit without changing the arrangement of the quantizer.

Second Embodiment

Figure 5:
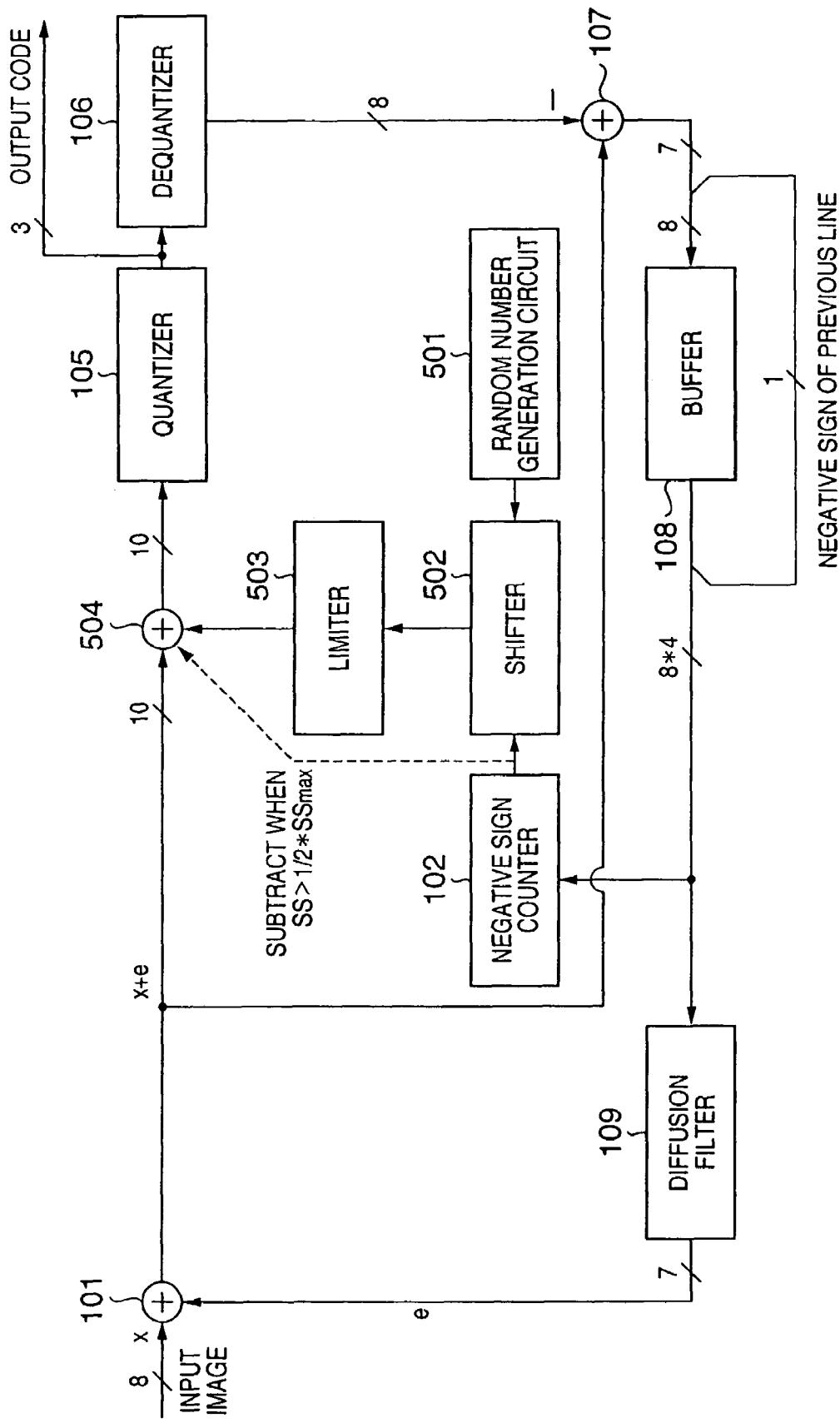
FIG. 5 is a block diagram for explaining the arrangement of an image processing apparatus according to the second embodiment of the present invention.
Figure 17:
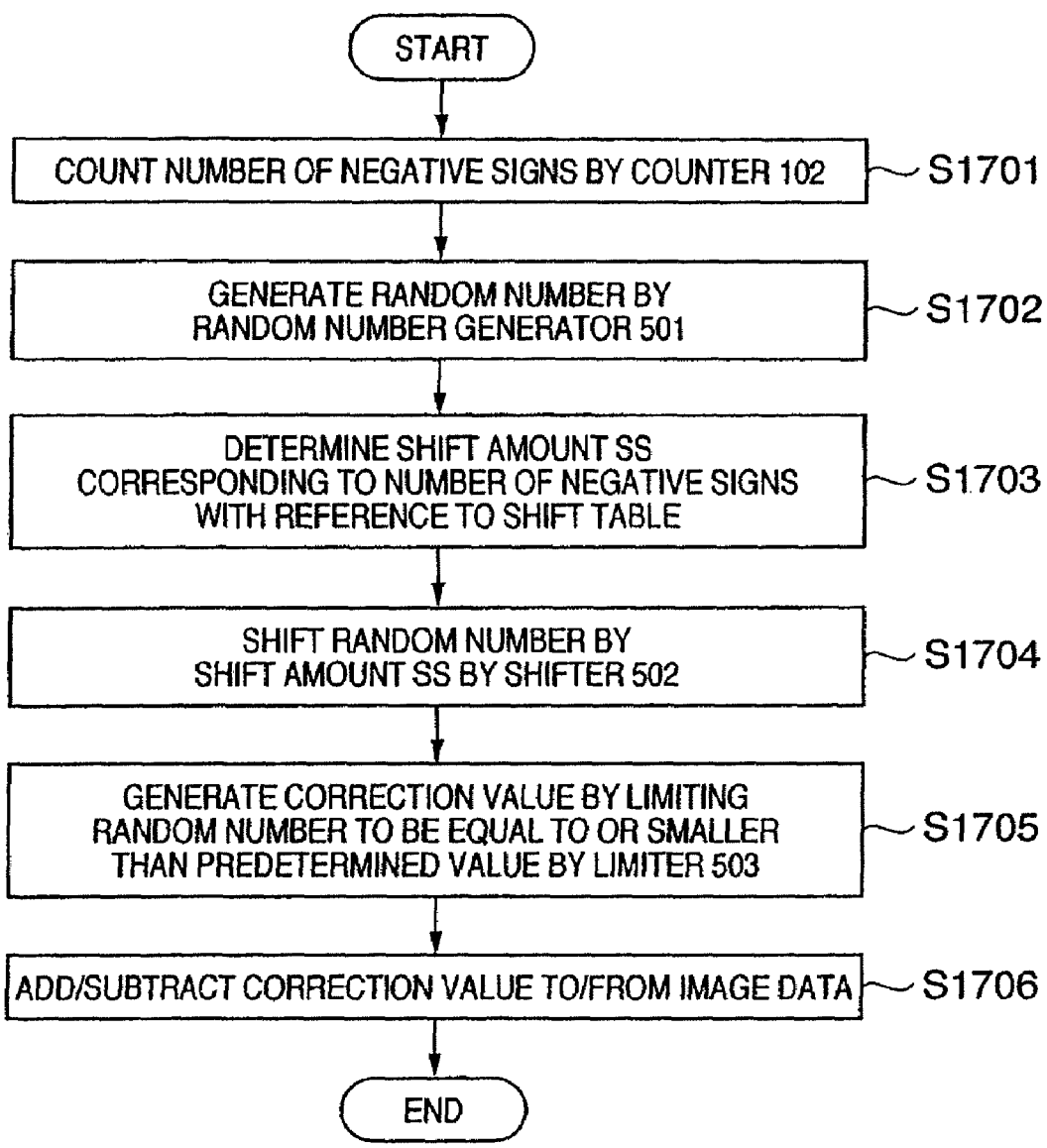
FIG. 17 is a flowchart showing an example of a correction value generation process corresponding to the second embodiment of the present invention.

FIG. 5 is a block diagram showing the arrangement of an image processing apparatus according to the second embodiment of the present invention. Referring to FIG. 5, blocks 101 to 109 have the same functions as those of the corresponding blocks in FIG. 1. In FIG. 5, new blocks 501 to 504 are added, i.e., reference numeral 501 denotes a random number generation circuit; 502, a shifter; 503, a limiter; and 504, an adder/subtractor. Only differences from the first embodiment will be described below with reference to FIG. 17. FIG. 17 is a flowchart showing an example of a correction value generation process corresponding to this embodiment.

In step S1701, the number SS of negative signs in a pixel group near the pixel of interest is counted by the negative sign counter 102. In step S1702, the random number generation circuit 501 generates a random number of a predetermined number of bits. Furthermore, in step S1703, the shifter 502 determines a shift amount of the random number with reference to a shift table (to be described in detail later) on the basis of the total number SS of negative signs input from the negative sign counter 102. In step S1704, the random number is shifted by the shift amount. In step S1705, the limiter 503 limits the shifted random number to be equal to or smaller than a predetermined value, and inputs the limited value to the adder/subtractor 504. In step S1706, the adder/subtractor 504 adds the limited random number when the total number SS of negative signs from the negative sign counter 102 is smaller than ½ of the number of pixels (i.e., the maximum value of SS) of the negative sign detection window, or subtracts the limited random number when the number SS is larger than ½ of the number of pixels of the negative sign detection window.

A practical operation will be described below. The random number generation circuit 501 generates a random number as an integer ranging from 0 to 32, and uses, e.g., an M-sequential pseudo-random code generation circuit using LFSR (Linear Feedback Shift Register) or the like.

Figure 6:
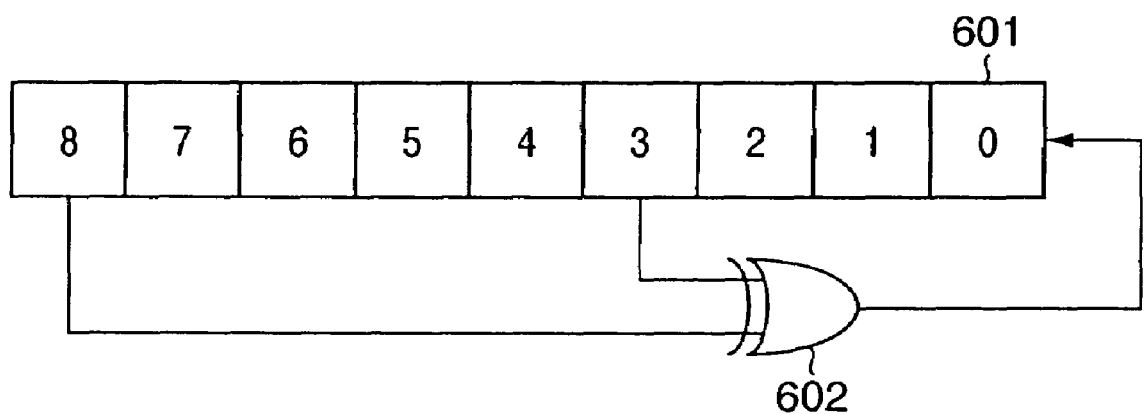
FIG. 6 is a diagram showing an example of the arrangement of a random number generation circuit 501.

FIG. 6 shows an example of the arrangement of a 9-bit M-sequential pseudo-random code generation circuit. Reference numeral 601 denotes a shift register; and 602, an EXOR circuit (exclusive OR circuit).

In the M-sequential pseudo-random code generation circuit, a value other than 0 is loaded to the shift register, and the EXOR result of bits corresponding to a primitive polynomial of the shift register is input to bit 0 to left-shift the bits, thus obtaining a random number. In this embodiment, since the number of stages of the shift register 901 is nine, a nonic primitive polynomial $X^9+X^4+1$ is used.

Hence, the EXOR result of bits 8 and 3 of the shift register 601 by the EXOR circuit 602 is input to bit 0, and a left shift process is made in response to the next clock. With this arrangement, random numbers ranging from 1 to 511 are generated at 511 cycles. Since the correction value of input data to the quantizer 105 falls within the range from 0 to 31, random numbers from 0 to 31 are obtained at 511 cycles using arbitrary 5 bits of the shift register 601.

Figure 7:
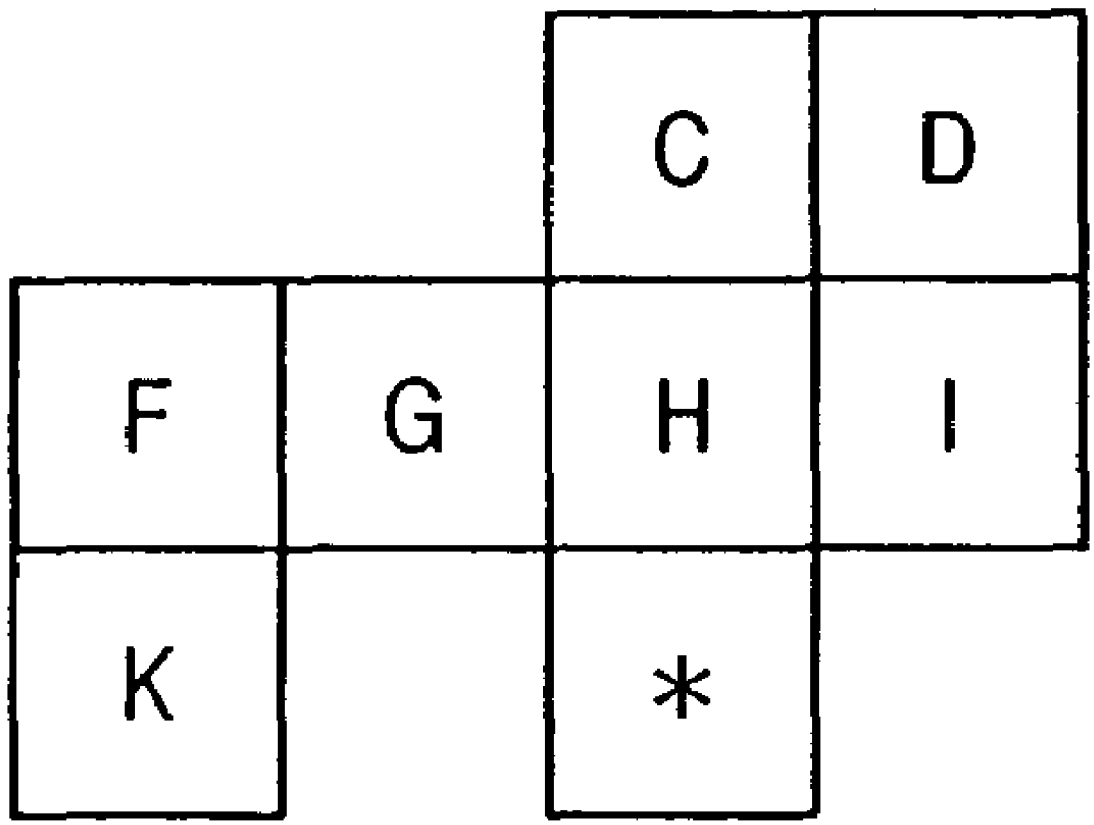
FIG. 7 shows an example of a second negative sign detection window.

The generated random number undergoes a right shift process by the shifter 502. When a negative sign detection window shown in FIG. 7 is used, the number of pixels of the negative sign detection window (i.e., a maximum value SSmax of the total number of negative signs) is 7. When the MSB of the total number SS of negative signs is 0 (the possible range of SS is 000 to 011, i.e., 3 or less), it is determined that the total number SS of negative signs is equal to or smaller than ½ of the number of pixels of the negative sign detection window; when the MSB of the total number SS of negative signs is 1 (the possible range of SS is 100 to 111, i.e., 4 or more), it is determined that the total number SS of negative signs is equal to or larger than ½ of the number of pixels of the negative sign detection window.

Table 3 below is an example of the shift table. In this case, the number of table entries is 8. However, using symmetry, the number of entries can be reduced to four as in the above case. Note that the shift table (Table 3) can be set to symmetrically store values about ½ of the number of pixels of the negative sign detection window. With such setup, the table can be configured to allow to look up the lower 2 bits (if the MSB is 1, the bit is inverted to maintain symmetry) of the total number SS of negative signs.

TABLE 3

| | SS | | | | | | | |
|---|---|---|---|---|---|---|---|---|
| | 0 | 1 | 2 | 3 | 4 | 5 | 6 | 7 |
| SFT | 0 | 3 | 3 | 1 | 1 | 3 | 3 | 0 |

In Table 3 above, when the total number SS of negative signs is 0 or 7, the random number is output intact without any shift process. When the total number SS of negative signs is 3 or 4, the random number undergoes a 1-bit right shift process when it is output. For example, when the generated random number is "00110" (i.e., 6), it is converted into "00011" (i.e., 3) by the 1-bit right shift process. When the total number SS of negative signs assumes other values, the random number undergoes a 3-bit right shift process when it is output. That is, when the total number SS of negative signs is 0 or 7, the random number value itself is output; when the total number SS of negative signs is 3 or 4, a value obtained by multiplying the random number by ½ is output; and when the total number SS of negative signs assumes other values, a value obtained by multiplying the random number by ⅛ is output.

Figure 8:
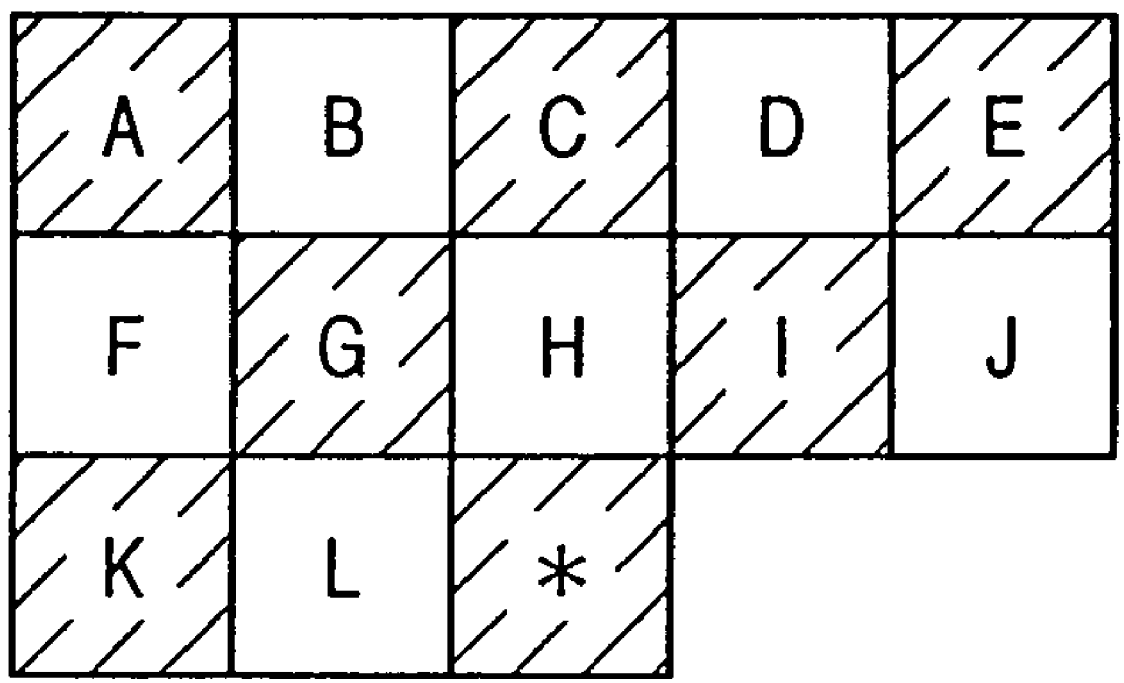
FIG. 8 shows an example of texture.
Figure 9:
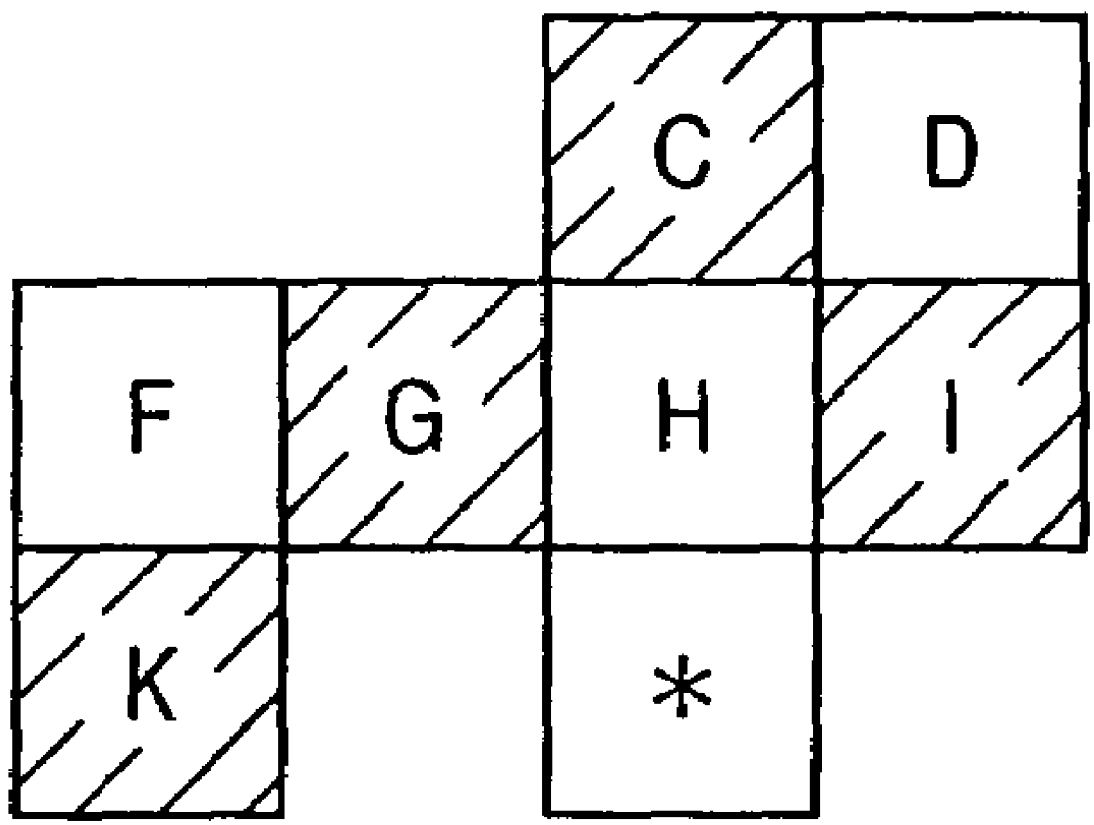
FIG. 9 shows the state of texture in the second negative sign detection window example.

The reason why relatively small shift amounts are set when the total number SS of negative signs assumes middle values is to generate dots to eliminate a specific "texture" pattern. For example, when a dot pattern shown in FIG. 8 is generated, the negative signs of quantization errors of pixels form nearly the same pattern. Hence, when the negative sign detection window shown in FIG. 7 is applied to FIG. 8, the number of negative signs in the window shown in FIG. 9 is SS=4.

In this manner, according to this embodiment, since the threshold value varies to eliminate any deviation of the negative signs in a pixel group within the negative sign detection window, the quantization threshold value consequently increases, and dots of higher densities become harder to generate. Since such pattern is generated when the input level value is close to a nearly middle value between the input level value and neighboring quantization representative value, a quantization error increases and, as a result, the output value from the diffusion filter 109 becomes relatively large.

Figure 10:
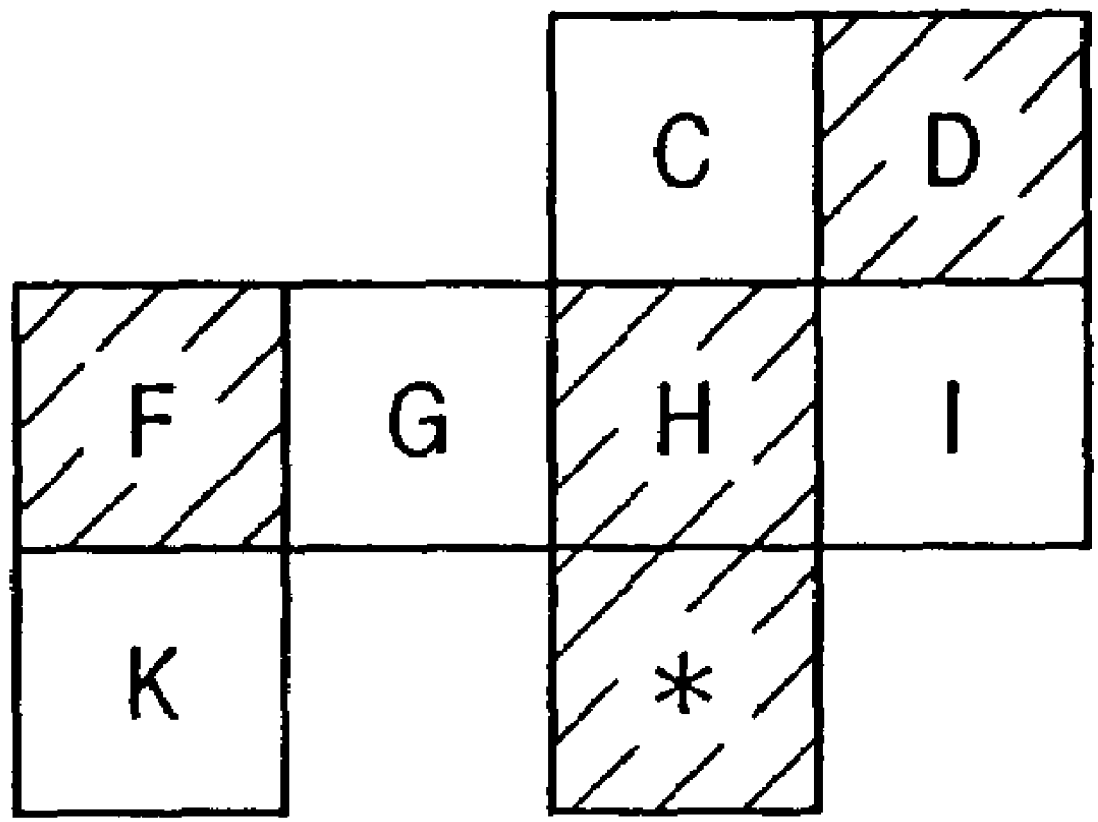
FIG. 10 shows the state of texture in a cycle next to FIG. 9.

Hence, in order to eliminate such pattern, since a relatively large correction value is required, a relatively small shift amount is set. Note that a pattern shown in FIG. 10 is generated at the next pixel position, and the quantization threshold value lowers to make dots of lower densities harder to generate.

Figure 11:
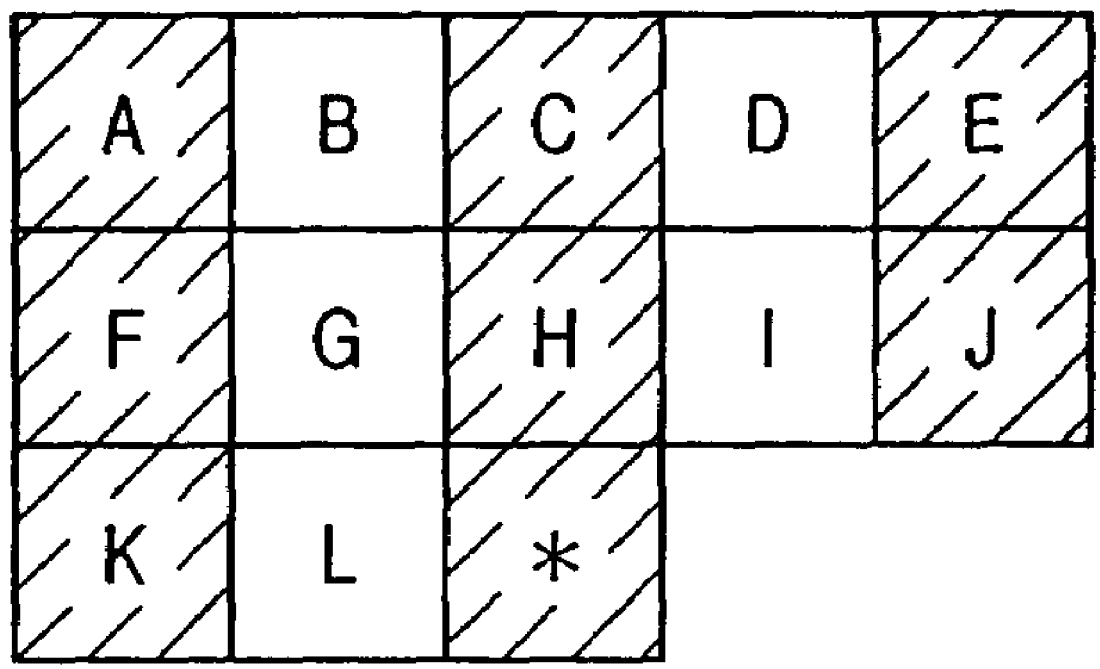
FIG. 11 shows another example of texture.
Figure 12:
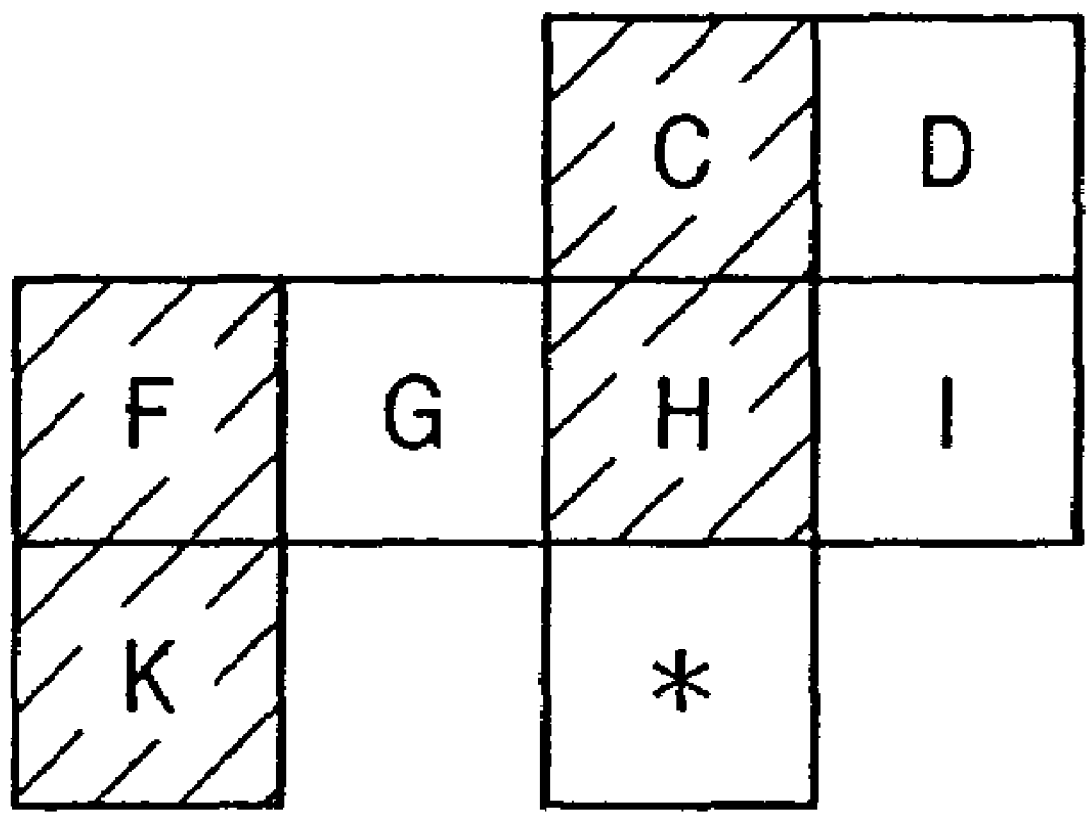
FIG. 12 shows the state of texture in FIG. 11 in the second negative sign detection window example.
Figure 13:
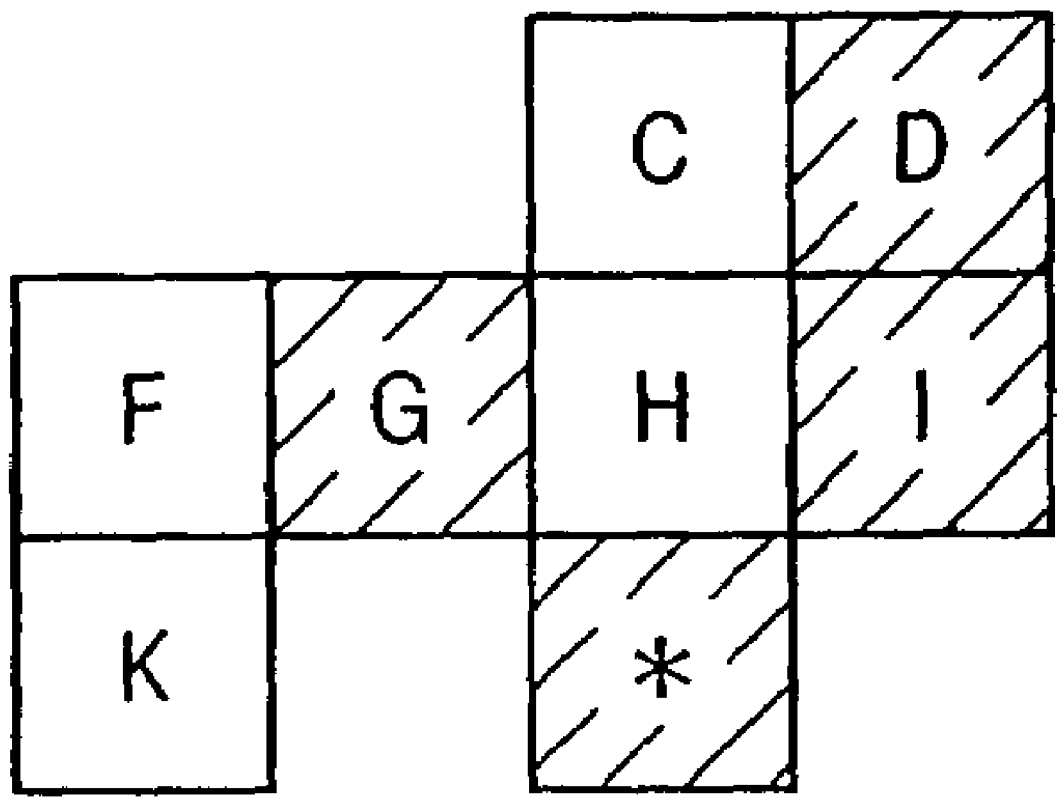
FIG. 13 shows the state of texture in a cycle next to FIG. 12.

FIG. 11 shows a pattern in which high-density dots line up in the vertical direction. When the negative sign detection window in FIG. 7 is applied to this pattern, a pattern shown in FIG. 12 is obtained. In this case, the number of pixels from which the negative sign is detected is four. Since the correction value is subtracted from input data to the quantizer 105, the quantization threshold value relatively increases, and dots with higher densities become harder to be generated (for this reason, FIG. 12 shows a pixel of interest (*) in white). In the next cycle, since a pattern shown in FIG. 13 appears, the number of pixels from which the negative sign is detected is three. Since the correction value is added to input data to the quantizer 105, the quantization threshold value relatively lowers, and dots with lower densities become harder to be generated (for this reason, FIG. 13 shows a pixel of interest (*) in gray). Furthermore, since the random number is used as the correction value, a specific pattern shown in FIG. 11 is broken, and a nearly random pattern is generated.

However, when the absolute value of the correction value is large, since a dot is immediately generated without accumulating errors, a dot may be attached to an edge portion or three quantization representative values may be present together at an input density near the quantization representative value of a smooth gradation portion, and a granular image may be formed (over correction).

Hence, since the limiter 503 applies a predetermined limitation to the maximum value of the shifted random number, such adverse effects are prevented. In the above example, the absolute value of the correction value ranges from 0 to 31 before the limiter 503, and it is limited by the limiter 503 to fall within the range from, e.g., 0 to 24. This limit value is normally determined based on the output density values of smooth gradation.

Note that the right shift process of the shifter 502 has been described. However, the present invention is not limited to this, and the shifter 502 may have a left shift configuration. For example, when the random number ranges from 0 to 3 (from "00000" to "00011"), substantially the same effect can be obtained when left shift amounts shown in Table 4 below are set. In this case, the absolute value of the correction value ranges from 0 to 24 (for example, "00011" is converted into "11000" by a 3-bit left shift process). Hence, when the aforementioned limit value is 24, the limiter 503 can be omitted. However, in case of the left shift process, the random number range must have a lower upper limit, as described above.

TABLE 4

| | SS | | | | | | | |
|---|---|---|---|---|---|---|---|---|
| | 0 | 1 | 2 | 3 | 4 | 5 | 6 | 7 |
| SFT | 3 | 0 | 0 | 2 | 2 | 0 | 0 | 3 |

In this embodiment, the random number value is limited using the limiter 503 after it is shifted. Alternatively, bits may be shifted after the maximum value of the random number is limited. In this case, the limiter 503 limits the random number so that the absolute value of the correction value after the shift process becomes equal to or smaller than a predetermined value.

A multiplier may be used in place of the shifter 502. In this case, a coefficient table is used in place of the shift table. By setting appropriate coefficients, the absolute value of the correction value can be limited to be equal to or smaller than a predetermined value. In this case as well, the limiter 503 can be omitted.

The adder/subtractor 504 adds the limited correction value when the MSB of the total number SS of negative signs is 0, or subtracts the limited correction value when the MSB of the total number SS of negative signs is 1. That is, when the number of pixels of the negative sign detection window is (power of 2−1), a function may be switched based on the MSB of the total number SS of negative signs.

In order to simply the addition/subtraction process, the limited correction value may be inverted and added based on the MSB of the total number SS of negative signs. In this case, although correction values are set in a positive/negative asymmetric pattern, since the arrangement for correcting the threshold value (i.e., correction within the error diffusion loop) is adopted, the same output density is obtained.

As described above, according to the present invention corresponding to this embodiment, since input data to the quantizer can be corrected in accordance with the number of negative signs of quantization errors in a pixel group near the pixel of interest using the random number generator, image quality deterioration factors due to "sweeping", "texture", "worm", and the like in error diffusion can be removed by a relatively simple circuit without changing the arrangement of the quantizer. Since shift, multiplication, and the like are used, adverse effects due to correction value addition can be minimized, and correction can be applied within an optimal random number range according to image quality deterioration factors.

Third Embodiment

Figure 14:
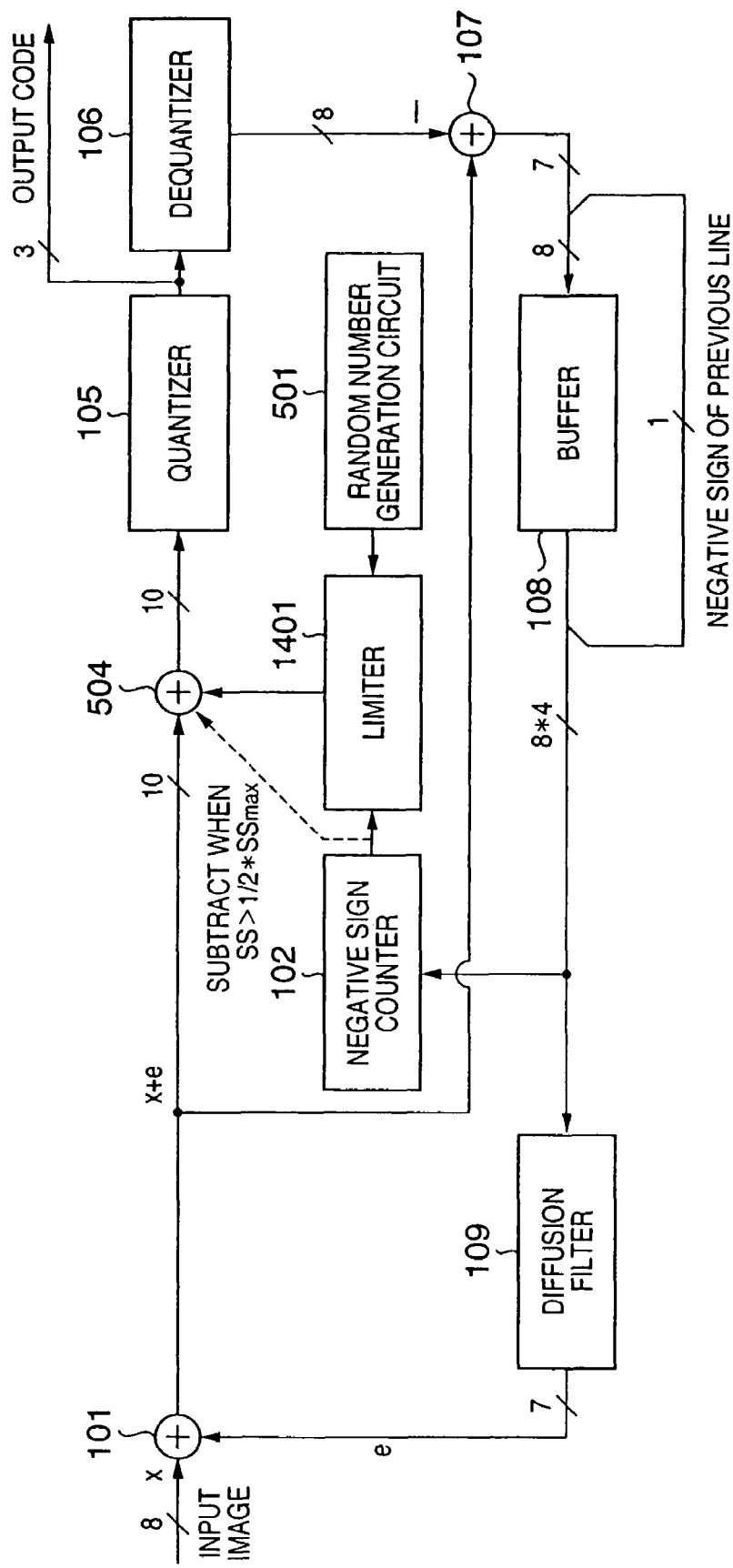
FIG. 14 is a block diagram for explaining the arrangement of an image processing apparatus according to the third embodiment of the present invention.

FIG. 14 is a block diagram showing the arrangement of an image processing apparatus according to the third embodiment of the present invention. Referring to FIG. 14, blocks 101 to 109, 501, and 504 have the same functions as those of the corresponding blocks in FIGS. 1 and 5. In FIG. 14, a new block 1401 is added, i.e., reference numeral 1401 denotes a limiter. Only differences from the second embodiment will be described below.

In this embodiment, a limit table is adopted in place of the shift table used in the second embodiment, and a random number which is limited by a limit value according to the total number SS of negative signs is used as a correction value.

A practical operation of the present invention corresponding to this embodiment will be described below. The limiter 1401 determines a limit value of the random number with reference to a limit table (to be described in detail later) on the basis of the total number SS of negative signs input from the negative sign counter 102. The limiter 1401 limits the random number according to the determined limit value, and inputs the limited random number to the adder/subtractor 504. The adder/subtractor 504 adds the limited random number when the total number SS of negative signs is smaller than ½ of the number of pixels of the negative sign detection window (i.e., the maximum value of SS), or subtracts the limited random number when the total number SS of negative signs is larger than ½ of the number of pixels of the negative sign detection window.

As in the second embodiment, when the number of pixels of the negative sign detection window is "$2^n-1$", a function can be switched based on the MSB of the total number SS of negative signs. Also, in order to simplify the addition/subtraction process, the limited correction value may be inverted and added based on the MSB of the total number SS of negative signs. In this case, although correction values are set in a positive/negative asymmetric pattern, since the arrangement for correcting the threshold value (i.e., correction within the error diffusion loop) is adopted, the same output density is obtained. If the limit value used when the MSB of the total number SS of negative signs is "1" undergoes "−1" correction in advance, positive/negative symmetry can be assured.

Table 5 below is an example of the limit table when the number of pixels of the negative sign detection window is 7. Since a detailed description has been given in the first and second embodiments, it will be omitted. In this limit table, the number of table entries can be reduced to four using symmetry.

TABLE 5

| | SS | | | | | | |
|---|---|---|---|---|---|---|---|
| 0 | 1 | 2 | 3 | 4 | 5 | 6 | 7 |
| LMT 24 | 3 | 3 | 15 | 15 | 3 | 3 | 24 |

In this manner, since this embodiment adopts the arrangement for limiting the random number in accordance with the total number SS of negative signs, the probability that the correction value becomes a limit value for all the total numbers SS of negative signs, and the number of pixels to which correction is effectively applied increases. As a result, in a portion where the deviation of the total number SS of negative signs of a pixel group detected by the negative sign detection window is large, "sweeping" is prevented. In a portion where the deviation of the total number SS of negative signs is small, "texture" and "pseudo contour" are prevented. In a portion where the deviation of the total number SS of negative signs is middle, a stripe pattern called "worm" can be effectively prevented.

As described above, according to the present invention, the negative signs of quantization errors near the pixel of interest are extracted, and the correction value of the quantization threshold value is generated to eliminate deviation of the negative signs on the basis of the total number of extracted negative signs, thus effectively preventing "sweeping" by a simple arrangement. Also, by optimizing the negative sign detection window and the threshold value correction value, "texture" and "pseudo contour" as regular patterns, and "worm" as dots that appear continuously can be eliminated.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-203937 filed on Jul. 30, 2003 and Japanese Patent Application No. 2004-149388 filed on May 19, 2004, the entire contents of which are hereby incorporated by reference herein.

What is claimed is:

1. An image processing method for executing a quantization process of image data by error diffusion, using a computer to perform steps comprising:
    a step of calculating a diffusion error for a pixel of interest based on quantization errors, stored in a storing unit, of neighboring pixels of the pixel of interest;
    a step of generating first image data by adding the calculated diffusion error to input image data of the pixel of interest;
    a step of generating second image data by quantizing the first image data by comparing the first image data with a threshold value;
    a step of generating third image data by dequantizing the second image data;
    a quantization error calculation step of calculating a quantization error for each pixel on the basis of a difference between the first and third image data;
    a storage step of storing the calculated quantization error for a predetermined number of pixels in the storage unit;
    a counting step of counting a number of neighboring pixels of the pixel of interest having a quantization error with a predetermined sign based on sign bits of the calculated quantization error for neighboring pixels of the pixel of interest, wherein each sign bit indicates that the corresponding calculated quantization error is positive or negative; and
    a control step of controlling the threshold value of the pixel of interest according to a count result in said counting step.

2. The method according to claim 1, wherein the control step comprises
    a step of generating a random number, and a step of generating a correction value for correcting the threshold value, based on the count result and the generated random number.

3. The method according to claim 2, wherein the control step includes a step of holding a random number shift table which defines in advance shift amounts used to shift a bit sequence indicating the generated random number in correspondence with the count result, referring to the shift amount defined in the generated random number shift table corresponding to the count result, and generating the correction value based on a value obtained by shifting the generated random number by the shift amount.

4. The method according to claim 3, wherein the control step further comprises a limit step of limiting an upper limit value of an absolute value of the value obtained by shifting the random number by the shift amount to be not more than a predetermined value.

5. The method according to claim 2, wherein the control step includes a step of holding a random number limit table that defines limit values used to limit the range of values that the random number can assume in correspondence with the count result, referring to the limit value defined in the random number limit table corresponding to the count result, and generating the correction value based on a value obtained by limiting the random number by the limit value.

6. An image processing program, stored in a computer readable storage medium, for making a computer execute an image processing method of claim 1.

7. A computer readable storage medium storing an image processing program which when executed, causes a computer to perform the steps of claim 6.

8. The image processing method according to claim 1, wherein in said counting step, the number of sign bits is counted for the positive calculated quantization error, and in said control step the threshold value is decreased.

9. The image processing method according to claim 1, wherein in said counting step, the number of sign bits is counted for the negative calculated quantization error, and in said control step the threshold value is increased.

10. The image processing method according to claim 1, wherein in said control step, the first image is modified using a correction value generated based on the count result, and in said second image data generation step, second image data is generated by quantizing the modified first image data by comparing the modified first image data with the threshold value.

11. An image processing apparatus for executing a quantization process of image data by error diffusion, comprising:
- a storage unit for storing quantization errors for a predetermined number of pixels:
- a unit for calculating a diffusion error for a pixel of interest based on quantization errors, stored in the storing unit, of neighboring pixels of the pixel of interest;
- a unit for generating first image data by adding the calculated diffusion error to input image data to the pixel of interest;
- a unit for generating second image data by quantizing the first image data by comparing the first image data with a threshold value;
- a unit for generating third image data by dequantizing the second image data;
- a quantization error calculation unit for calculating a quantization error for each pixel on the basis of a difference between the first and third image data, wherein the calculated quantization error is stored in the storage unit;
- a counting unit for counting a number of neighboring pixels of interest having a quantization error with a predetermined sign based on sign bits of the calculated quantization error for neighboring pixels of the pixel of interest, wherein each sign bit indicates that the corresponding calculated quantization error is positive or negative; and
- a control unit for controlling the threshold value of the pixel of interest according to a count result from said counting unit.

12. The apparatus according to claim 11, wherein said control unit comprises a unit for generating a random number, and generates a correction value for correcting the threshold value based on the count result and the random number.

13. The apparatus according to claim 12, wherein said control unit holds a random number shift table which defines in advance shift amounts used to shift a bit sequence indicating the random number in correspondence with the count result, refers to the shift amount defined in the random number shift table corresponding to the count result, and generates the correction value based on a value obtained by shifting the random number by the shift amount.

14. The apparatus according to claim 13, wherein said control unit further comprises a limit unit for limiting an upper limit value of an absolute value of the value obtained by shifting the random number by the shift amount to be not more than a predetermined value.

15. The apparatus according to claim 12, wherein said control unit holds a random number limit table that defines limit values used to limit the range of values that the random number can assume in correspondence with the count result, refers to the limit value defined in the random number limit table corresponding to the count result, and generates the correction value based on a value obtained by limiting the random number by the limit value.

16. The image processing apparatus according to claim 11, wherein said counting unit counts the number of sign bits for the positive calculated quantization error, and said control unit decreases the threshold value.

17. The image processing apparatus according to claim 11, wherein said counting unit counts the number of sign bits for the negative calculated quantization error, and said control unit increases the threshold value.

18. The image processing apparatus according to claim 11, wherein said control unit modifies the first image using a correction value generated based on the count result, and said unit for generating second image data generates the second image data by quantizing the modified first image data by comparing the modified first image data with the threshold value.

* * * * *